United States Patent
Chang et al.

(10) Patent No.: US 12,526,738 B2
(45) Date of Patent: Jan. 13, 2026

(54) RELAY SELECTION AND RESELECTION BASED ON DISCOVERY MESSAGE TRANSMISSION RESOURCES

(71) Applicant: Kyocera Corporation, Kyoto (JP)

(72) Inventors: Henry Chang, San Diego, CA (US); Amit Kalhan, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 313 days.

(21) Appl. No.: 18/032,908

(22) PCT Filed: Oct. 18, 2021

(86) PCT No.: PCT/US2021/055403
§ 371 (c)(1),
(2) Date: Apr. 20, 2023

(87) PCT Pub. No.: WO2022/086849
PCT Pub. Date: Apr. 28, 2022

(65) Prior Publication Data
US 2023/0336962 A1 Oct. 19, 2023

Related U.S. Application Data

(60) Provisional application No. 63/104,390, filed on Oct. 22, 2020.

(51) Int. Cl.
*H04W 48/20* (2009.01)
*H04B 17/318* (2015.01)
(Continued)

(52) U.S. Cl.
CPC .......... *H04W 48/20* (2013.01); *H04B 17/328* (2023.05); *H04W 8/005* (2013.01); *H04W 48/16* (2013.01); *H04W 92/18* (2013.01)

(58) Field of Classification Search
CPC ..... H04W 8/005; H04W 48/16; H04W 92/18; H04W 48/12; H04W 88/04; H04W 40/12;
(Continued)

(56) References Cited

U.S. PATENT DOCUMENTS

| 10,383,035 B2 | 8/2019 | Sheng | |
|---|---|---|---|
| 2014/0112162 A1* | 4/2014 | Tavildar | H04W 72/23 370/252 |

(Continued)

OTHER PUBLICATIONS

LG Electronics; "Operation in Type 1 Resource Allocation for D2D Discovery," R1-142149; 3GPP TSG RAN WG1 Meeting #77; Seoul, KR; May 10, 2014.

*Primary Examiner* — Nimesh Patel

(57) ABSTRACT

A remote user equipment (UE) device receives a sidelink (SL) discovery message from each of a plurality of candidate relay UE devices where each SL discovery message is transmitted using a discovery resource of a discovery resource pool of a plurality of discovery resource pools. Each discovery resource pool is allocated to a range of Reference Signals Received Power (RSRP) levels. Each relay UE device measures an RSRP level of a link to a destination and transmits the SL discovery message using a discovery resource from the discovery pool associated with the RSRP range containing the measured RSRP level. The remote UE device selects (or reselects) a relay UE device from the candidates based, at least partially, on the RSRP ranges of the links from the candidate relay devices to the destination.

16 Claims, 9 Drawing Sheets

(51) Int. Cl.
  *H04W 8/00* (2009.01)
  *H04W 48/16* (2009.01)
  *H04W 92/18* (2009.01)

(58) Field of Classification Search
  CPC ..... H04W 40/22; H04W 40/24; H04W 76/14; H04W 72/02; H04W 52/0229; H04W 52/0245; H04W 72/54; H04W 28/0268; H04W 72/20; H04W 28/0236; H04W 28/0967; H04W 48/10; H04W 84/042; H04W 4/023; H04W 72/04; H04W 36/302; H04W 56/002; H04W 72/563; H04W 76/10; H04W 36/18; H04W 36/00833; H04W 36/144; H04W 36/03; H04W 72/00; H04W 88/14; H04W 72/23; H04W 72/0446; H04W 72/1268; H04W 72/21; H04W 72/542; H04W 60/04; H04W 8/24; H04W 72/25; H04W 36/00698; H04W 36/0094; H04W 72/543; H04W 92/02; H04W 92/16; H04W 72/535; H04W 16/18; H04W 68/12; Y02D 30/70; H04J 11/0079; H04J 11/0056; H04J 11/0026; H04J 11/00; H04J 11/0059; H04J 11/0069; H04J 11/0023; H04J 2011/0096; H04J 11/0036; H04J 11/0053; H04J 11/005; H04J 13/004; H04J 13/18; H04L 5/0007; H04L 2001/0097; H04L 41/0803; H04L 43/08; H04L 5/006; H04L 5/0037; H04L 5/0053; H04L 5/0048; H04L 5/0023; H04L 5/0055; H04L 5/0098; H04L 27/261; H04L 1/0026; H04L 41/0894; H04B 7/0695; H04B 7/0452; H04B 7/0626; H04B 7/0617; H04B 17/318; H04B 17/336; H04B 7/06954; H04B 17/327; H04B 7/15507; H04B 17/382; H04B 17/346; H04B 17/328; H04B 17/3913; H04B 7/088; H04B 17/345; H04B 7/0632; H04B 7/24; G06N 20/00; G06N 3/063

See application file for complete search history.

(56) References Cited

U.S. PATENT DOCUMENTS

| | | | |
|---|---|---|---|
| 2015/0119055 A1* | 4/2015 | Shin | H04W 8/005 |
| | | | 455/450 |
| 2016/0269887 A1 | 9/2016 | Kim et al. | |
| 2018/0139794 A1* | 5/2018 | Chae | H04W 56/002 |
| 2018/0213379 A1* | 7/2018 | Xiong | H04W 4/70 |
| 2018/0352412 A1* | 12/2018 | Huang | H04W 36/0055 |
| 2019/0373652 A1* | 12/2019 | Hong | H04W 76/14 |
| 2020/0008127 A1* | 1/2020 | Ohtsuji | H04W 4/70 |
| 2020/0344665 A1* | 10/2020 | Liao | H04W 72/02 |
| 2023/0053351 A1* | 2/2023 | Cheng | H04W 40/12 |

* cited by examiner

RELAY SELECTION AND RESELECTION BASED ON DISCOVERY MESSAGE TRANSMISSION RESOURCES

CLAIM OF PRIORITY

The present application claims the benefit of priority to Provisional Application No. 63/104,390 entitled "Sidelink relay reselection based on discovery announcements", filed Oct. 22, 2020, assigned to the assignee hereof and hereby expressly incorporated by reference in its entirety.

CROSS REFERENCE TO RELATED APPLICATIONS

This application is related to U.S. application Ser. No. 18/032,885, which is a national stage application of PCT/US2021/055397, entitled "PC5 BROADCAST MESSAGES WITH SELECTED SYSTEM INFORMATION", filed concurrently with this application and incorporated by reference in its entirety herein.

FIELD

This invention generally relates to wireless communications and more particularly to wireless communication links using relay devices.

BACKGROUND

Many wireless communication systems that employ several base stations that provide wireless service to user equipment (UE) devices enable sidelink communication between two or more UE devices where the UE devices can communicate directly with other UE devices. With sidelink communication, UE devices transmit data signals to each other over a direct link using the cellular resources instead of through a base station such Proximity Services (ProSe) communication is sometimes also referred to as device-to-device (D2D). In addition, one or more UE devices can be used as relay devices between a UE device and a destination where the relay device forwards data between a UE device and the destination. The destination may be a communication network or another UE device (destination UE device). Where the destination is the network, the relay UE device forwards the data to a base station (gNB). In some situations, for example, the UE device may be out of the service area of the base station and the relay UE device provides a communication link routed from such an out-of-coverage (OoC) UE device through a relay UE device to the base station.

SUMMARY

A remote user equipment (UE) device receives a sidelink (SL) discovery message from each of a plurality of candidate relay UE devices where each SL discovery message is transmitted using a discovery resource of a discovery resource pool of a plurality of discovery resource pools. Each discovery resource pool is allocated to a range of Reference Signals Received Power (RSRP) levels. Each relay UE device measures an RSRP level of a link to a destination and transmits the SL discovery message using a discovery resource from the discovery pool associated with the RSRP range containing the measured RSRP level. The remote UE device selects (or reselects) a relay UE device from the candidates based, at least partially, on the RSRP ranges of the links from the candidate relay devices to the destination.

DETAILED DESCRIPTION

Figure 1A:
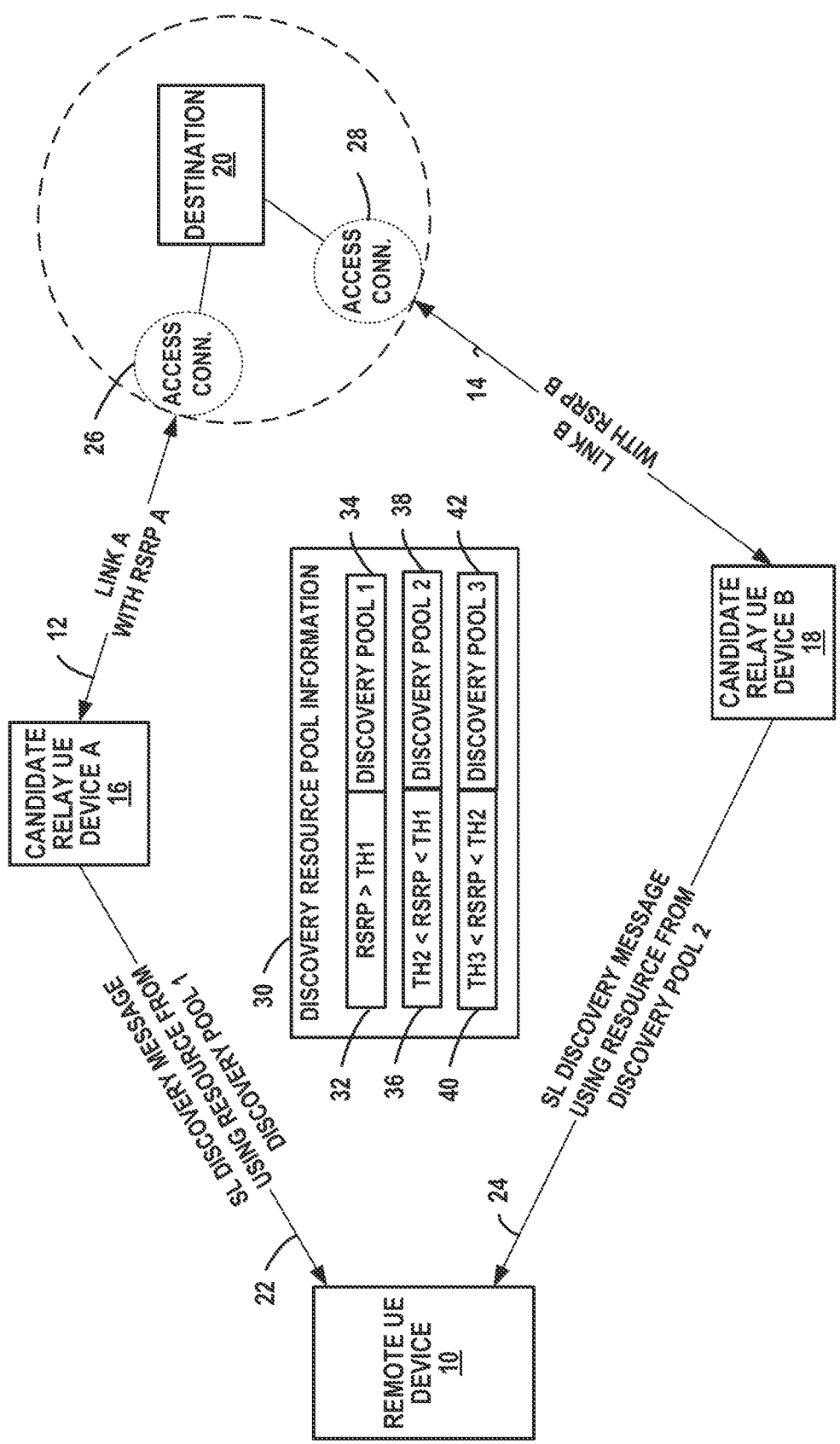
FIG. 1A is a block diagram for an example where a remote UE device determines the quality of the links from a plurality of candidate relay UE devices to a destination based on discovery resources used to transmit SL discovery messages from the candidate relay UE devices.

As discussed above, a relay UE device provides connectivity between a remote UE device and a destination which can be another UE device (destination UE device) or a network. Where the destination is the network, the relay provides connectivity to a cell provided by a base station (gNB) of the network. The relayed connection between a remote UE device and destination UE device is sometimes referred to as a UE to UE (U2U) relay connection. The relayed connection between a remote UE device and a base station (gNB) is sometimes referred to as a UE to network (U2N) relay connection. In conventional systems where the relay connects to a base station (gNB), the relay UE device is required to meet certain criteria to function as a relay. For example, the relay UE device must be in coverage and have a cellular (Uu) communication link to the base station of sufficient quality in order to be available for relaying functions. For U2N relaying, therefore all candidate relay devices are assumed to be within coverage of the base station (gNB). Any relay UE that does not meet the suitability criteria, which is based on satisfying the Uu RSRP threshold requirements, will not be a candidate relay UE device and will not send discovery messages indicating the UE device can support relay functionality. The remote UE device, which may be OoC in many situations, connects to the relay UE device over a sidelink (PC5) communication link. Since either or both the remote UE device and the relay UE device may be moving, the quality of the PC5 link and/or the quality of cellular Uu link may degrade. A link failure of either link will prompt the remote UE device to search for another relay UE device. In at least some conventional systems, the gNB configures or preconfigures the remote UE device with a PC5 quality threshold (e.g., minimum sidelink RSRP (SL-RSRP threshold) or sidelink discovery RSRP (SD-RSRP) threshold) which triggers the remote UE device to begin the relay reselection procedure. Accordingly, when the quality of the PC5 connection to the relay UE device drops below the threshold, the remote UE device searches through candidate relay devices to select another relay UE device with a higher quality sidelink connection. Whether selecting a relay UE device when first establishing the relayed link to the destination or whether reselecting a relay UE device when the current relayed connection through a relay UE device falls below a quality threshold, it is at least sometimes advantageous for the remote UE device to base the selection or reselection on the link quality of the links from the candidate relay UE devices to the destination.

For the examples herein, the remote UE device determines the range of link quality levels to the destination for each candidate relay UE device based on the discovery resource used to transmit the SL discovery messages from the candidate relay UE devices. Each candidate relay device measures the RSRP level of the link to the destination and determines the discovery resource pool that is associated with the measured RSRP level. The remote determines the discovery resource used for the transmission of each SL discovery message and applies discovery pool information to determine the RSRP range of the link to the destination from each candidate relay UE device. The discovery pool information used by the remote UE device may be preconfigured information, updated information provided by a base station, or may be updated information forwarded by a relay device as part of selected system information.

In some relaying situations, a remote UE device is connected to a gNB through a relay UE device that is within coverage of the gNB and is RRC Connected to the gNB. Where the remote UE is within coverage, the remote UE can obtain system information (SI) directly from the gNB. The remote UE device, for example, is capable of receiving System Information Blocks (SIBs) transmitted by the gNB. The remote UE device typically cannot receive system information directly from the gNB where the remote UE device is out-of-coverage (OoC) even though the remote UE is RRC Connected to the gNB. As a result, there is no way, in conventional systems, for the gNB to control the remote UE device while it is not yet connected to the relay UE device. In particular, it may be advantageous for the gNB to control access of particular UE devices to the network, which is typically controlled via system information, and since it is up to the remote UE device to determine whether it is allowed to access the network, the remote UE device needs updated system information to determine whether it is allowed to access the network. Although the remote UE device has the option to use the pre-configured control information to perform relay reselection, the pre-configured control information cannot be updated dynamically by the gNB. More specifically, the OoC remote UE device is not made aware of changes in the gNB system information associated with accessing the gNB. Further, the discovery procedure is intended to work among different Public Land Mobile Networks (PLMNs) and the pre-configured control from one PLMN may differ from that of another PLMN. In particular, frequency priority may differ from one PLMN to another. As a result, the OoC remote UE device may not have the frequency priority of a gNB in a particular PLMN where the remote UE device is attempting to connect to the gNB. In addition, when the remote UE device is selecting/reselecting a relay UE device, it is often useful for the remote UE device to consider the system information associated with the gNBs serving the candidate relay UE devices. Accordingly, in addition to more efficient relay selection/reselection based on the quality of the relay to destination link, there is a need for providing an OoC remote UE device with current system information of the gNB serving a relay UE device.

Although the techniques discussed herein may be applied to various types of systems and communication specifications, the devices of the example operate in accordance with at least one revision of a 3GPP New Radio (NR) V2X communication specification. The techniques discussed herein, therefore, may be adopted by one or more future revisions of communication specifications although the techniques may be applied to other communication specifications where sidelink or D2D is employed. More specifically the techniques may be applied to current and future releases of 3GPP NR specifications. For example, the techniques may also be applied to 3GPP NR (Rel-17).

FIG. 1A is a block diagram for an example where a remote UE device 10 determines the quality of the links 12, 14 from a plurality of candidate relay UE devices 16, 18 to a destination 20 based discovery resources used to transmit SL discovery messages 22, 24 from the candidate relay UE devices 16, 18. For the example, the destination 20 may be a destination UE device or the communication network. Where the destination 20 is the network, each link 12, 14 may be to the same cell of the same base station (gNB), to different cells of the same base station (gNB), or to different cells provided by different base stations (gNBs). For the example of FIG. 1A, link A 12 is to an access connection 26 of the destination 20 and the link B 14 is to the access connection 28 of the destination. Where the links 12, 14 are to the same cell or to a destination UE device, the access connections 26, 28 are the same access connection. For a destination UE device, for example, the access connection is the transceiver of the UE device. Where link A 12 is to a first cell and link B is to a second cell, the access connections are different cells that may be provided by the same base station or by different base stations.

In accordance with known techniques, the relay UE device A 16 measures the RSRP of link A 12 and the relay UE device B 18 measures the RSRP of link B 14. Each relay UE device 16, 18 determines the discovery resource pool that should be used for transmission SL discovery messages. Based on discovery pool information 30 that may be pre-configured or provided in an SB12, other SIB, or other message to the relay UE device 16, 18, each relay UE device 16, 18 determines the RSRP range containing the measured RSRP to identify the corresponding discovery pool. The discovery pool information 30 allocates a pool of discovery communication resources, such as time-frequency resources, to each RSRP range of a plurality of RSRP ranges. For the example of FIG. 1A, a first RSRP range 32 including RSRP values greater than a first threshold (TH1) is associated with a first discovery pool (discovery pool 1) 34, a second RSRP range 36 including RSRP levels between the first threshold (TH1) and second threshold (TH2) is associated with a second discovery pool (discovery pool 2) 38, and a third RSRP range 40 including RSRP levels between the second threshold (TH2) and a third threshold (TH3) is associated with a third discovery pool (discovery pool 3) 42. The relay UE device A 16 determines that the RSRP A of the link A 12 requires SL discovery messages to be transmitted using a resource from discovery pool 1 and relay UE device B 18 determines that the RSRP B of the link B 14 requires SL discovery messages to be transmitted using a resource from discovery pool 2. The measured RSRP level A of the link A 12 as measured by the candidate relay UE device 16 is greater than the first threshold (TH1). The measured RSRP level B of the link B 14 as measured by the candidate relay UE device B 18 is between the second threshold (TH2) and the third threshold (TH3).

The relay UE device A 16 transmits a SL discovery message 22 using a resource from discovery pool 1 and the relay UE device B 18 transmits a SL discovery message 24 using a resource from discovery pool 2. The remote UE device 10 determines the discovery resource used for the transmission of each SL discovery message 22, 24 and applies discovery pool information to determine the RSRP range of the link A 12 and link B 14. As discussed below, the discovery pool information used by the remote UE device may be preconfigured information, updated information provided by a base station, or may be updated information forwarded by a relay device as part of selected system information. The remote UE device 10 evaluates the RSRP ranges associated with each discovery resource and selects/reselects a relay UE device based, at least partially, on the RSRP ranges. As discussed below, the selection/reselection is typically also based on at least the RSRP levels of the PC5 links to each relay UE device 16, 18.

Figure 1B:
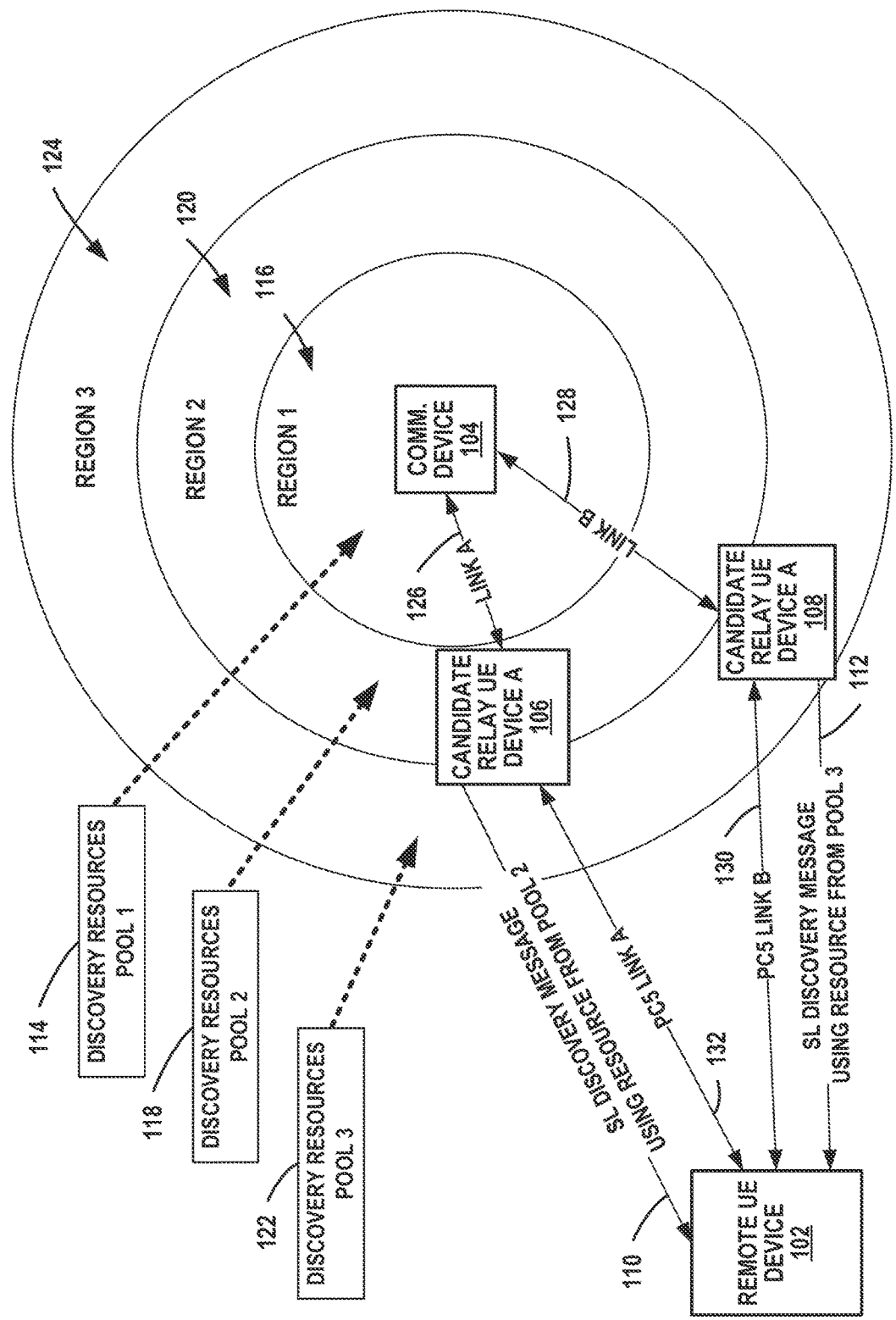
FIG. 1B is a block diagram of a communication system for an example where a remote UE device selects a relay UE device based on discovery pool resources allocated based on link quality to a target communication device.

FIG. 1B is a block diagram of a communication system 100 for an example where a remote UE device 102 selects a relay UE device based on discovery pool resources allocated based on link quality to a target communication device 104. For the example, the target communication device may be a base station (gNB) or another UE device and the quality is determined based on RSRP. The link between the relay UE device and the target communication device 104 is a Uu link where the target device 104 is a gNB. The link between the relay UE device and the target communication device 104 is a PC5 link in the examples where the target device 104 is a target UE device. Therefore, the arrangement of FIG. 1B is an example of FIG. 1A where the both relay UE devices have links to single access connection such a single base station or a destination UE device. The remote UE device 102 is establishing, or maintaining, a relayed communication link to the target communication device 104 and is selecting/resetting a relay UE device from a plurality of candidate relay UE devices 106, 108. Each candidate relay UE device 106, 108 transmits a sidelink discovery message 110, 112 using a discovery communication resource where the discovery communication resources are allocated based on the RSRP level of the link to the target communication device 102. For the example, the discovery pool resources are allocated for three regions where a discovery resources pool 1 114 is associated with region 1 116, discovery resources pool 2 118 is associated with second region 120, and discovery resources pool 3 122 is associated with a third region 124. Each of the discovery resource pools has at least one communication resource allocated for transmission of sidelink discovery messages. The discovery resources pool 1 114 is allocated for communication links having a quality greater than a first threshold. For the example, if a candidate relay UE device measures an RSRP of the link to the target communication device that is higher than a first RSRP threshold, the candidate relay UE device uses a communication resource from pool 1 114 to transmit a sidelink discovery message. The discovery resources pool 2 118 is allocated for communication links having a quality between a first threshold and second threshold. For the example, if a candidate relay UE device measures an RSRP of the link to the target communication device to be between the first threshold and the second threshold, the candidate relay UE device uses a communication resource from pool 2 118 to transmit a sidelink discovery message. The discovery resources pool 3 122 is allocated for communication links having a quality between the second threshold and a third threshold. For the example, if a candidate relay UE device measures an RSRP of the link to the target communication device to be between the second threshold and the third threshold, the candidate relay UE device uses a communication resource from Pool 3 122 to transmit a sidelink discovery message.

The discovery resources pool information defining the allocation of resources to the discovery resources pools is managed by the network. For the examples herein, the discovery resources pool information is communicated to the relay UE device through a SIB where the Uu RSRP thresholds are defined for each discovery pool resource.

Continuing with the example of FIG. 1B, the remote UE device 104 receives a sidelink discovery message 110 from the relay UE device A 106 and determines the communication resources used to transmit the sidelink discovery message 110. The remote UE device 102 also receives a sidelink discovery message 112 from the relay UE device B 108 and determines the communication resources used to transmit the sidelink discovery message 112. The remote UE device 102 determines the region where each candidate relay UE device is located. Based on the discovery communication resources used for the discovery message, the remote UE device determines at least a range of the quality of the link between each relay UE device and the target communication device 104. For example, the resource used for the SL discovery signal 110 indicates a range of values that includes the RSRP of Link A 126 as measured by the relay UE device 106. The resource used for the SL discovery message 112 indicates a range of values that includes the RSRP of Link B 128 as measured by the relay UE device 106. The remote UE device 102 than evaluates the relay communication path through each of the relay UE devices 106, 108 to select/reselect a UE relay device two paths. The selected relay UE device may not be the relay UE device with the highest quality link to the target communication device since other factors may be considered. For example, relay UE device B 108 may be preferred to relay UE device A 106 where the PC5 link B 130 provides a much better overall path as compared to the relay UE device A 106 because of a lower quality of the PC5 Link A 132. In other cases, the selected relay UE device may also depend on upper layer (application layer) criteria, unrelated to radio signal strengths.

Figure 2:
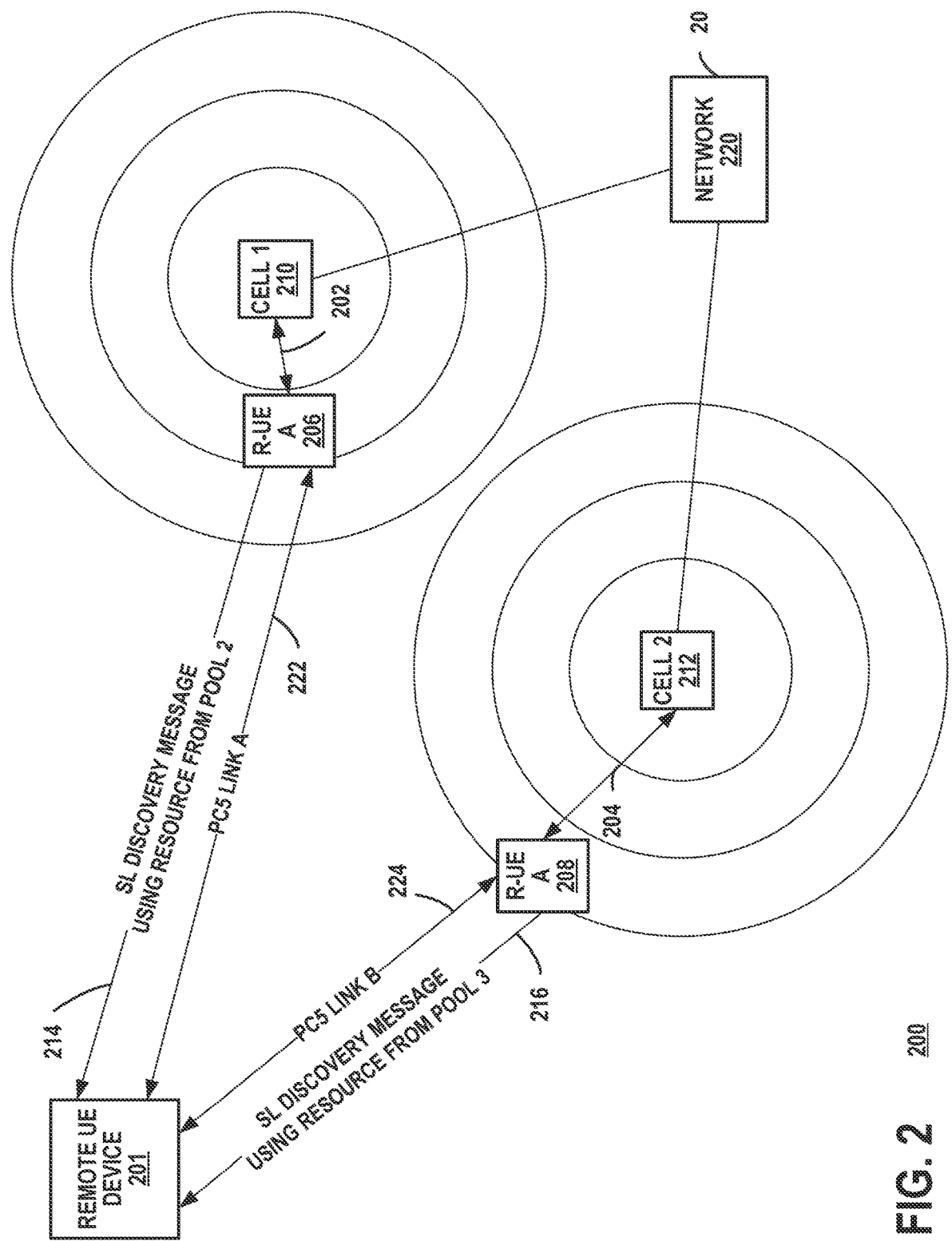
FIG. 2 is a block diagram for an example where a remote UE device determines the quality of the Uu links from a plurality of candidate relay UE devices to two cells based on discovery resources used to transmit SL discovery messages from the candidate relay UE devices.

FIG. 2 is a block diagram for an example where a remote UE device 201 determines the quality of the Uu links 202, 204 from a plurality of candidate relay UE devices 206, 208 to two cells 210, 212 based on discovery resources used to transmit SL discovery messages 214, 216 from the candidate relay UE devices 216, 218. Accordingly, the arrangement of FIG. 2 is an example of the system of FIG. 1A where the destination 20 is the network 220 and each relay UE device 216, 218 has a Uu link 202, 204 to a different cell 210, 212. For the example, the candidate relay UE A 206 measures a Uu RSRP to the first cell 210 which is within an RSRP range associated with a discovery pool 2 and the candidate relay UE B 208 measures a Uu RSRP to the second cell 210 which is within an RSRP range associated with a discovery pool 3. The remote UE device determines the resources used to transmit the discovery messages 214, 216 and applies the discovery pool information to determine the RSRP range of each Uu link 202, 204. Although in typical situations the discovery pool information for both cells 210, 212 is the same, in some situations, the thresholds, resources or number of discovery pools of each cell may be different. As a result, the remote UE device 201 may have the discovery pool information for both cells 210, 212 to determine the RSRP ranges of the two UU links 202, 204.

After determine the RSRP ranges for the Uu link 202 and the Uu link 204, the remote UE device 201 selects/reselects a relay UE device from the two relay UE devices 206, 208 to establish/maintain a U2N link. The remote UE device 201 does not necessarily select the relay UE device with the best quality Uu link and may use other criteria in selecting/reselecting a relay UE device. For example, the remote UE device 201 may evaluate the quality of the PC5 link 222, 224 to each relay in determining the preferred U2N link where the preferred relay UE device may have a higher quality PC5 link. In other cases, the selected relay UE device may also depend on upper layer (application layer) criteria, unrelated to radio signal strengths.

Figure 3:
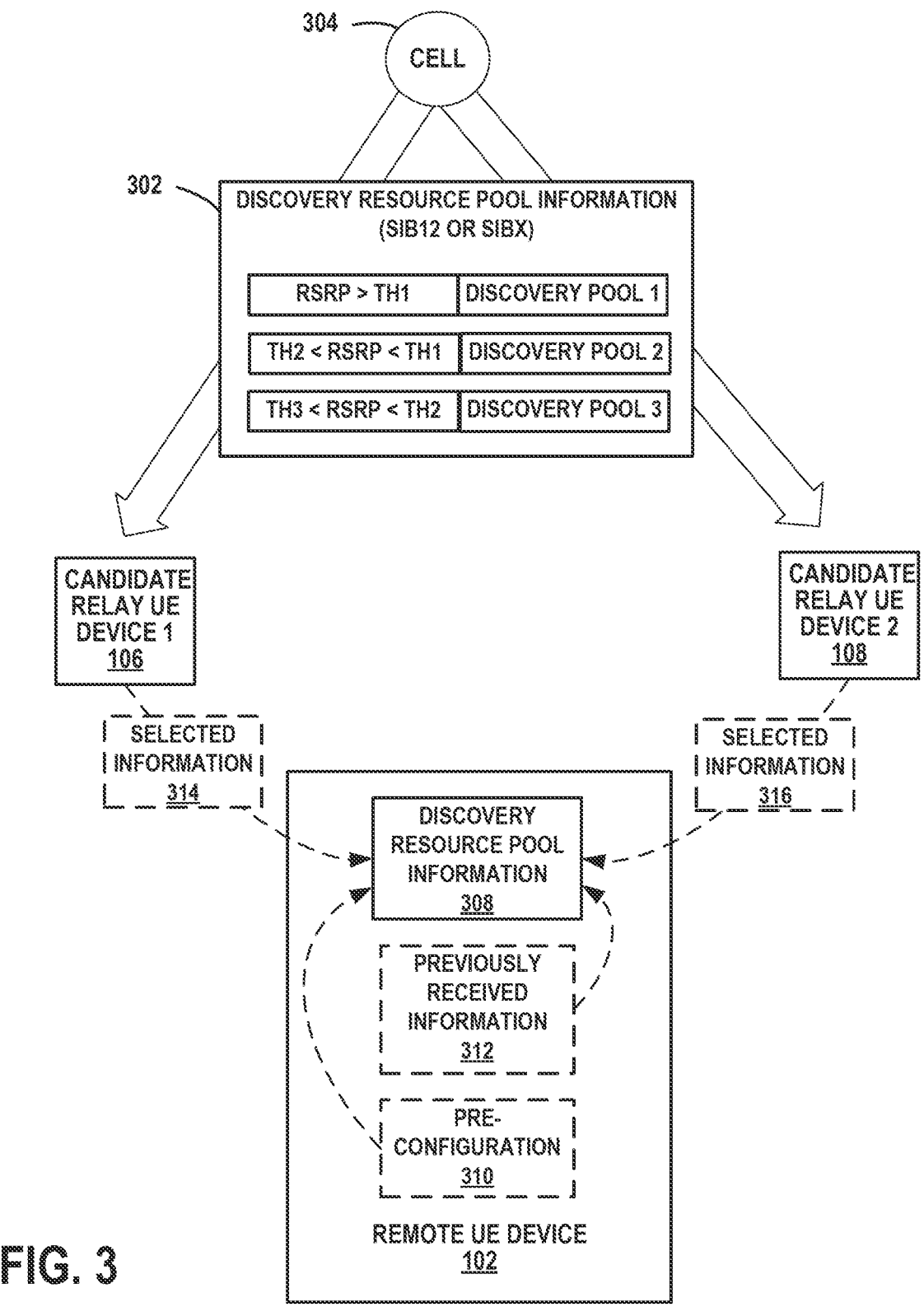
FIG. 3 is block diagram of an example discovery pool information being provided to two relay UE devices from a single cell.

FIG. 3 is block diagram of an example discovery pool information 302 being provided to two relay UE devices 106, 108 from a single cell 304. For the example, discovery pool information is transmitted as part of SIB12 for shared discovery pool information and in another SIB for dedicated discovery pool information. In some situations, the discovery pool information 302 may conveyed using other types of messaging. In accordance with at least some revisions of the communication specification, SIB 12 at least includes the sl-TxPoolSelectedNormal IE that provides information regarding the shared resource pool for discovery and traffic.

In a typical scenario, each relay UE device 106, 108 performs frequency reselection while in the IDLE or INACTIVE states and may prioritize frequencies that broadcast SIB12. After camping on a cell of the SL frequency, each relay UE device 106, 108 obtains the latest SIB12 to receive the discovery resource pool information 302 that identifies the discovery resource pools and the associated RSPR thresholds. Each relay UE device 106, 108 measures its Uu RSRP to determine which discovery resource pool should be used for discovery transmission.

The remote UE device 102 determines the discovery resource used to transmit a SL discovery message and applies discovery resource pool information 308 to determine the RSRP range of the Uu link from the relay UE device 106, 108 to the cell 304. The locally stored discovery resource pool information 308 may be acquired in different ways. The discovery resource pool information 308 may be preconfigured information provided during pre-configuration 310 in some situations. In other situations, previously received information 312 may provide the most current discovery resource pool information 308. Where the remote UE device 102 was previously connected to the cell 304, or a neighboring cell of the cell 304, the discovery resource pool information 308 may have been provided by the cell 304 or neighboring cell in a SIB (SIB12 or SIBx). As discussed below in further detail, discovery resource pool information 308 is provided by a candidate relay UE device in some situations. The discovery resource pool information 308 may be part of selected system information 314 from the relay UE device 106 and/or as part of selected system information 316 from the relay UE device 108. For the example of FIG. 3, the blocks representing the pre-configuration 310, previously received information 312, and the selected information 314, 316 are shown with dashed lines to indicate any one or more of the sources may provide the discovery resource pool information 308.

Figure 4:
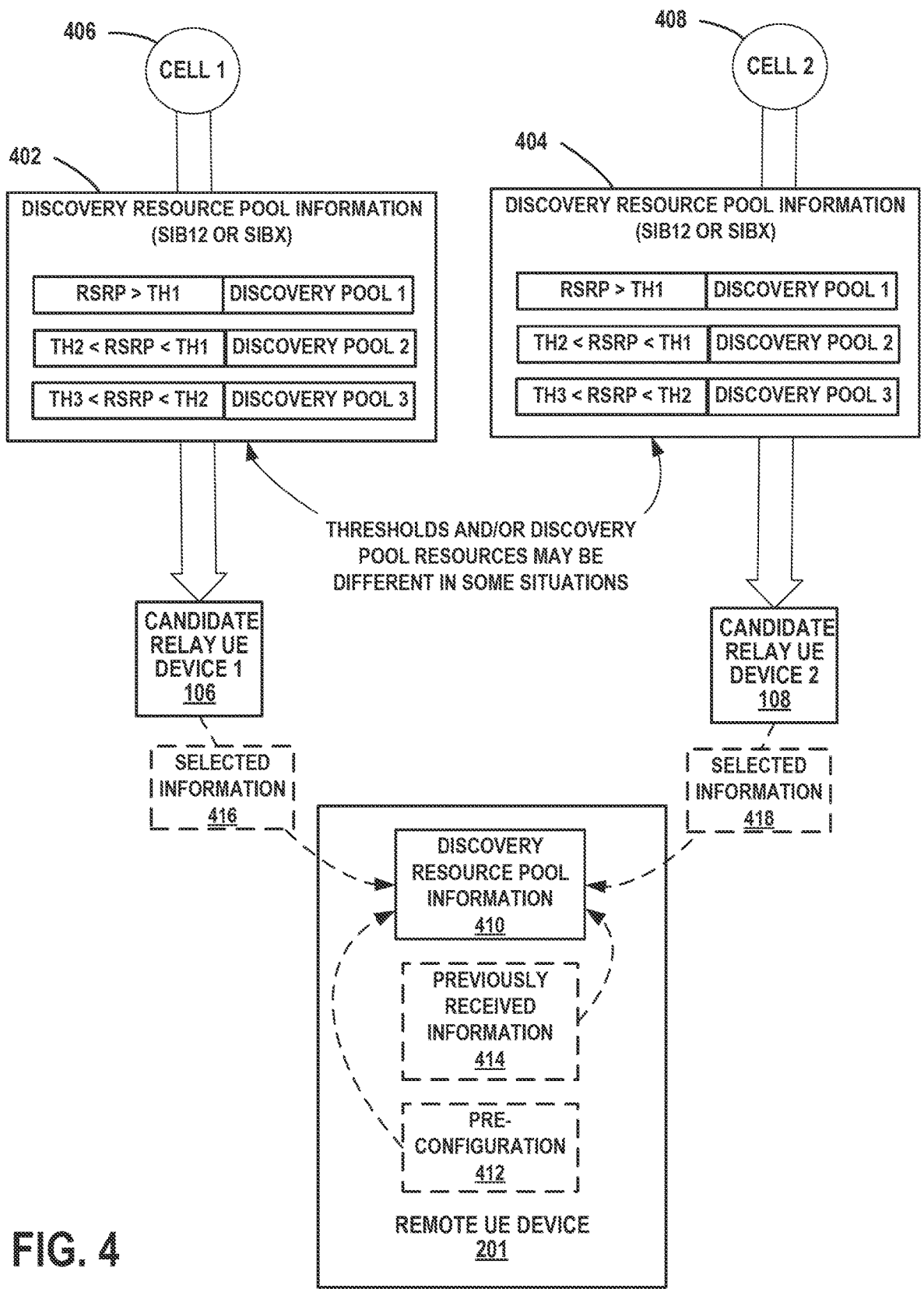
FIG. 4 is block diagram of an example discovery pool information is being provided to two relay UE devices from a two cell.

FIG. 4 is block diagram of an example discovery pool information 402, 404 is being provided to two relay UE devices 106, 108 from a two cell 406, 408. For the example, discovery pool information is transmitted as part of SIB12 for shared discovery pool information and in another SIB for dedicated discovery pool information. In some situations, the discovery pool information 402, 404 may conveyed using other types of messaging. In accordance with at least some revisions of the communication specification, SIB12 at least includes the sl-TxPoolSelectedNormal IE that provides information regarding the shared resource pool for discovery and traffic.

In a typical scenario, each relay UE device 106, 108 performs frequency reselection while in the IDLE or INACTIVE states and may prioritize frequencies that broadcast SIB12. After camping on a cell of the SL frequency, each relay UE device 106, 108 obtains the latest SIB12 to receive the discovery resource pool information 302 that identifies the discovery resource pools and the associated RSPR thresholds. Each relay UE device 106, 108 measures its Uu RSRP to determine which discovery resource pool should be used for discovery transmission.

For the example of FIG. 4, the relay UE device 106 receives the discovery resource pool information 402 from a first cell 406 and the relay UE device 108 receives the discovery resource pool information 404 from a second cell 408. The first cell and the second cell may be provided by the same gNB or by different gNBs. In some scenarios, the network may establish the same discovery resource pool configuration for a region that the discovery resource pool information for each gNB (and every cell) in the region is the same. Accordingly, in some situations, the discovery resource pool information 402 is the same as the discovery resource pool information 404. In other situations, however, the discovery resource pool information 402 may differ from the discovery resource pool information 404. For example, the thresholds and/or the resources of each pool for a RSRP range may be different.

The remote UE device 102 determines the discovery resource used to transmit a SL discovery message and applies the discovery resource pool information 410 to determine the RSRP range of the Uu link from each relay UE device 106, 108 to the serving the cell 406, 408 or each relay UE device 106, 108. Where the discovery resource pool information 402 is different from the discovery resource pool information 404, the discovery resource pool information 410 at the remote UE device includes information reflecting the thresholds and resources of each pool and applies the appropriate information corresponding to the cell that is serving the relay UE device from which the discovery message was received.

The locally stored discovery resource pool information 410 may be acquired in different ways. The discovery resource pool information 410 may be preconfigured information provided during pre-configuration 412 in some situations. In other situations, previously received information 414 may provide the most current discovery resource pool information 410. Where the remote UE device 102 was previously connected to one of the cells 406, 408, or a neighboring cell of one of the cells 406, 408, the discovery resource pool information 410 may have been provided by one or both of the cells 406, 408 or a neighboring cell in a SIB (SIB12 or SIBx). As discussed below in further detail, discovery resource pool information 410 is provided by a candidate relay UE device in some situations. The discovery resource pool information 410 may be part of selected system information 416 from the relay UE device 106 and/or as part of selected system information 418 from the relay UE device 108. Where the discovery resource pool information 402 is different from the discovery resource pool information 404, the selected information may include information for both. For the example of FIG. 4, the blocks representing the pre-configuration 412, previously received information 414, and the selected information 416, 418 are shown with dashed lines to indicate any one or more of the sources may provide the discovery resource pool information 410.

Figure 5A:
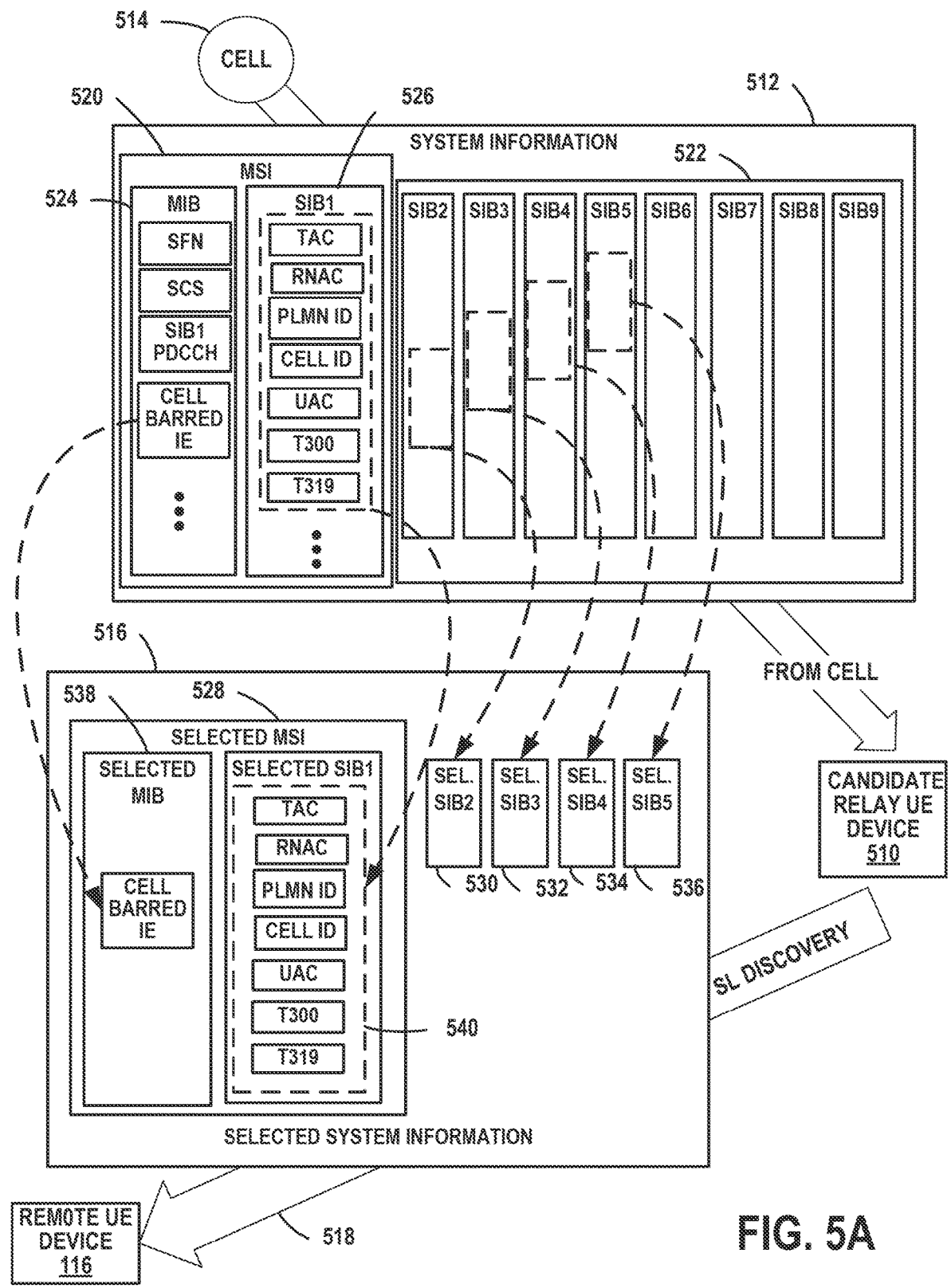
FIG. 5 is a block diagram for an example where a candidate relay UE device receives system information from a cell provided by a base station (gNB) and transmits selected system information in a sidelink discovery message.

FIG. 5 is a block diagram for an example where a candidate relay UE device 510 receives system information 512 from a cell 514 provided by a base station (gNB) and transmits selected system information 516 in a sidelink discovery message 518. For the examples discussed herein, the selected system information 516 is transmitted in a sidelink discovery message 518. In some situations, however, other PC5 broadcast signals can be used to provide the selected system information 516 to one or more remote UE devices. The system information 512 includes information in accordance with conventional systems and typically includes at least Minimum System Information 520 and often includes Other System Information (OSI) 522. MSI 520 includes a Master Information Block (MIB) 524 in an MIB message broadcasted on the Physical Broadcast Channel (PBCH) and a System Information Block 1 (SIB1) 526 sent in a SIB message on the Physical Downlink Shared Channel (PDSCH) through the Radio Resource Control (RRC) layer. Therefore, although the system information 512 is illustrated as single block being transmitted to the candidate relay UE device 510, the information is conveyed over different channels. The OSI may include SIB2, SIB3, SIB4, SIB5, SIB6, SIB7, SIB8 and SIB9 as well as others, such as SIB 12 in some situations. The 5G specification specifies the information contained in the MIB and each of the several SIB messages.

The MIB 524 provides the System Frame Number (SFN), the Subcarrier Spacing (SCS), the SIB1 PDCCH resource, and the cell barred information (cellBarred IE). SIB1 526 includes Cell Selection Information, the Public Land Mobile Network ID (PLMN ID), Tracking Area Code (TAC), Cell Identity (Cell ID), RAN Notification Information, SI scheduling info for OSI, and Serving Cell Information. SIB2 includes cell re-selection information common for intra-frequency, inter-frequency and/or inter-RAT re-selection. SIB3 includes intra-frequency cell re-selection information such as PCI, q-Offset, q-RxLev, q-Qual, and Black cell list. SIB4 includes Inter frequency cell re-selection information such as New Radio Absolute Radio-Frequency Channel Number (NR-ARFCN). SIB5 includes inter-system cell re-selection toward LTE such as EARFCN. SIB6 includes Earth quake and Tsunami Warning System primary notifications. SIB7 includes Earth quake and Tsunami Warning System secondary notifications. SIB8 includes Commercial Mobile Alert services (CMAS) notifications. SIB9 includes timing information for UTC, GPS and local time. In some situations, SIB 12 may be sent which at least includes the sl-TxPoolSelectedNormal IE that provides information regarding the shared resource pool for discovery and traffic.

For the example of FIG. 5, the candidate relay UE device 10 processes the first system information for the cell 514 to generate the selected system information 516 which is a subset of the system information 512. The selected system information 516 includes at least selected MSI 528 which is a subset of the MSI 520. In some situations, the selected system information may include portions (subsets) of other system information. For the examples, the selected system information 516 may include selected SIB2 530, selected SIB3 532, selected SIB4 534, and selected SIB5 536, which are subsets of the relay-received SIB2, SIB3, SIB4 and SIB5, respectively.

For the examples herein, the selected MSI 528 includes remote UE cell access information 538 for accessing the cell 514 where the remote UE cell access information 538 may include the cell barred information (cellBarred IE), UAC configuration, PLMN ID, TAC, RAN based Notification Area Code (RNAC), Cell ID, T300 timer, and T319 timer. The TAC is for tracking area update when a UE device is in RRC IDLE state. The RNAC tracking area update when the UE is in RRC INACTIVE state. The T300 timer is used for establishing connection to the cell when the UE device is initially in IDLE state and is started upon sending a RRC Setup Request. The T319 timer is used for resuming a connection to the cell when the UE is initially in INACTIVE state and is started upon transmission of a RRC Resume Request. For the examples herein, the selected MSI 28 includes selected MBI 538 and selected SIB1 540. The selected MBI 538 includes the cellBarred IE from the MBI 524 which indicated whether the cell is barred, regardless of the UE type of UE category. For the examples, the selected SIB1 540 includes UAC information, T300 timer, T319 timer, PLMN ID, Cell ID, TAC, and RNAC. The T300 timer, T319 timer and the UAC information, such as uac-BarringInfo IE, are sent in the ue-TimersAndConstants IE. The CellAccessRelatedInfo IE includes the PLMN-IdentityInfo IE which includes PLMN ID, Cell ID, TAC, and RNAC.

Figure 6:
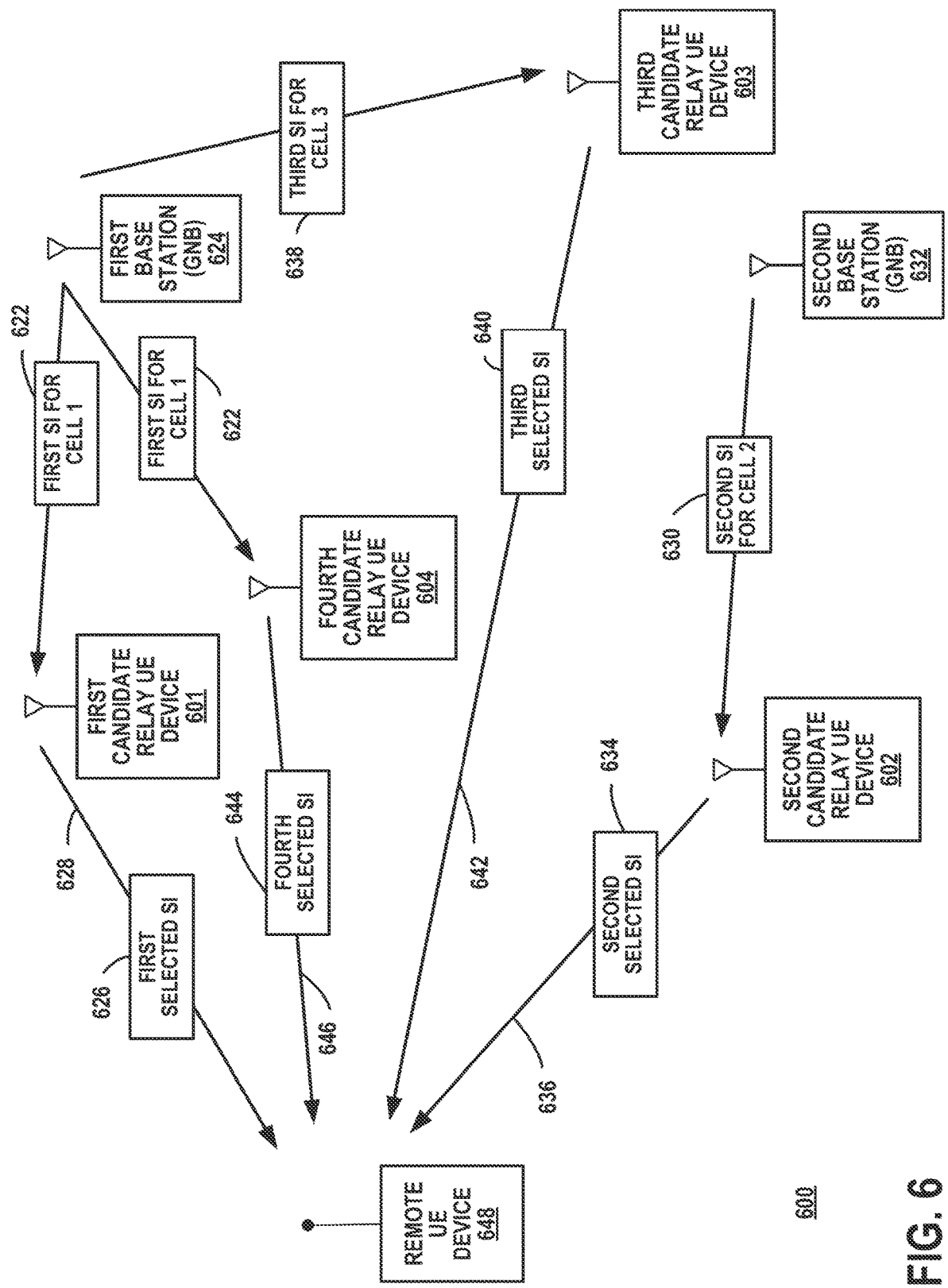
FIG. 6 is a block diagram of an example of a communication system where a plurality of candidate relay UE devices transmit selected system information in sidelink discovery messages where each selected system information is a subset of system information received from the serving cell of the candidate relay UE device.

FIG. 6 is a block diagram of an example of a communication system 600 where a plurality of candidate relay UE devices 601-604 transmit selected system information 606, 608, 610, 612 in sidelink discovery messages 614, 616, 618, 620 where each selected system information 606, 608, 610, 612 is a subset of system information received from the serving cell of the candidate relay UE device. Accordingly, the system 600 of FIG. 6 is an example where multiple relay candidate UE devices include selected system information in sidelink discovery messages that are received by a remote UE device in accordance with the example of FIG. 5. As discussed above, other PC5 broadcast signals can be used to provide the selected system information to one or more remote UE devices. Accordingly, one or more of the transmitted signals in FIG. 6 that include selected system information may be PC5 broadcast signals other than sidelink discovery signals. For the example, the UE devices may be any type of device that can receive signals from, and transmit signals to, base stations (gNBs) and other UE devices. The UE devices operate in a communication system that includes a plurality of base stations that each provide wireless service within a service area. Each base station provides wireless service within one or more cells. System information may be different between cells of the same gNB. Accordingly, for the example of FIG. 6, each system information is associated with a unique cell where one or more cells are provided by a gNB. In the interest of identification and clarity, the terms "first", "second", "third" and "fourth"

are used to label devices, equipment, and signals discussed with reference to FIG. 6. These terms are not intended to imply any preference or chronological order of the labeled items. Accordingly, the terms may be applied in a different manner without changing the description.

The examples discussed herein operate in accordance with many of the assumptions and characteristics of conventional UE-to-Network (U2N) relaying conventions. The discussed techniques, however, may be applied in other systems where one or more of the assumptions and characteristics may differ. As is known, U2N relaying was first specified in Rel-13 and further studied in Rel-15 where the legacy U2N relaying mechanism was considered as baseline. Systems operating in accordance with these standards operate in accordance with several characteristics. A ProSe U2N relay device is always in-coverage of the network. A ProSe U2N relay device performing sidelink communication for ProSe UE-to-Network Relay operation is in the RRC_CONNECTED state. The base station (gNB) controls whether a UE device can act as a ProSe U2N relay device. The gNB may provide transmission resources for ProSe U2N relay discovery using broadcast signaling for RRC_IDLE state, RRC_INACTIVE state and dedicated signaling for RRC_CONNECTED state. The gNB may provide reception resources for ProSe U2N relay discovery using broadcast signaling. The gNB may broadcasts a minimum and/or a maximum Uu link quality (RSRP) threshold(s) that the ProSe U2N relay device needs to satisfy before it can initiate a U2N relay discovery procedure. The remote UE device can transmit ProSe U2N relay discovery solicitation messages while in all RRC states depending on the configuration of resources for ProSe U2N relay discovery. The remote UE device performs radio measurements at the PC5 interface and uses the measurements for ProSe U2N relay selection and reselection along with higher layer criterion. Although not currently required by a NR communication specification, the remote UE device typically selects the ProSe U2N relay device, which satisfies higher layer criterion and has the best PC5 link quality among all suitable candidate ProSe U2N relays. Currently, for NR sidelink-based relay, a single-hop relay is considered, but extension to multi-hop relaying may also be supported.

For the example of FIG. 6, the first candidate relay UE device 601 receives first system information 622 for a cell (Cell 1) from a gNB (base station) 624. The first candidate relay UE device 601 processes the first system information 622 as discussed above with reference to FIG. 5 to generate first selected system information 626. The first candidate relay UE device 601 transmits the first selected system information 626 in a first sidelink discovery message 628. The sidelink discovery messages discussed with reference to FIG. 6 are transmitted in accordance with either the Model A discovery procedure or the Model B discovery procedure. With Model A, the relay UE devices periodically broadcast announcement messages to indicate their presence and provided connectivity services. With Model B, the procedure is initiated by a remote UE device, which broadcasts solicitation messages with the desired connectivity service. A relay UE device that can provide the solicited service sends a response message. Accordingly, the sidelink discovery messages may be the initial transmission of the discovery procedure or may be a response to the initial transmission of a remote UE device. However, the sidelink discovery message is the initial transmission of the discovery procedure that is from the relay UE device to a particular remote UE device with both discovery procedures.

Continuing with the example of FIG. 6, the second candidate relay UE device 602 receives second system information 630 for a cell (Cell 2) from a gNB (base station) 632. The second candidate relay UE device 102 processes the second system information 630 as discussed above with reference to FIG. 1A to generate second selected system information 634. The second candidate relay UE device 102 transmits the second selected system information 634 in a second sidelink discovery message 136.

The third candidate relay UE device 603 receives third system information 638 for a cell (Cell 3) from a gNB (base station) 624. For the example, therefore, the first gNB 624 provides at least two cells including Cell 1 and Cell 3. The third candidate relay UE device 603 processes the third system information 638 as discussed above with reference to FIG. 5 to generate third selected system information 640. The third candidate relay UE device 603 transmits the second selected system information 640 in a third sidelink discovery message 642.

Continuing with the example of FIG. 6, the fourth candidate relay UE device 604 receives first system information 622 for the cell (Cell 1) from the gNB (base station) 624. Accordingly, for the example, both the first candidate relay UE device 601 and the fourth candidate relay UE device 604 are served by the same cell (Cell 1) and, therefore, receive the same system information 622. The fourth candidate relay UE device 604 processes the first system information 622 as discussed above with reference to FIG. 5 to generate fourth selected system information 644. For the example, the first selected system information 626 and the fourth selected system information 644 are the same. The first selected system information 626 may be different from the fourth selected system information 644 in some situations where, for example, one candidate relay UE device includes additional selected system information. The fourth candidate relay UE device 604 transmits the first selected system information 644 in a first sidelink discovery message 646.

Accordingly, for the example, a remote UE device 648 receives four sidelink discovery signals 628, 636, 642, 646 either through the Model A or Model B procedures. The remote UE device 648 evaluates the selected system information 626, 634, 640, 644 received in the four discovery signals. The number of received sidelink discovery signals may be different in other situations where the number depends on the number of candidate relay UE devices in the area and the services they can provide. The remote UE device 648 performs relay selection/reselection at least partially based on the selected system information. In some situations, for example, the remote UE device 648 may determine that a particular candidate relay UE device should not be selected because the selected system information indicates that the serving gNB cannot support the services required by the remote UE device 648. In another case, the remote UE device determines that the selected system information indicates that the remote UE device is prohibited from accessing the cell. For the example, the relay selection/reselection is in accordance with conventional techniques that are based on criteria other than system information. For example, in the situation where two relay UE devices are served by the same cell, the remote UE device may prefer to select the relay UE device that includes a higher quality PC5 connection.

Typically, the cell also configures the frequency priority for IDLE/INACTIVE UE devices to establish which frequencies are used first when the IDLE/INACTIVE UE devices try to access the cell. Such configuration may be advantageous in managing congestion control and load balancing among frequency channels at the NW, for example. The frequency priority is broadcasted in SIB4 with at least two pertinent IEs including the cellReselectionPriority IE and the cellReselectionSubPriority IE. The cellReselectionPriority is a mandatory field and provides the absolute priority of concerned carrier frequency and is used in the cell reselection procedure. The highest priority value is 7 and lowest priority value is 0. The cellReselectionSubPriority is an optional field and a parameter indicates a fractional value to be added to the value of cellReselectionPriority to obtain the absolute priority of concerned carrier frequency for E-UTRA and NR. Value oDot2 corresponds to 0.2, value oDot4 corresponds to 0.4 and so on. The Absolute priority is the combination of cellReselectionPriority and CellReselectionSubPriority (if configured).

Frequency priority not only impacts the relay UE device which is connected to the cell in the Uu link, but can also influence the operation of a remote UE. If the relay UE device only serves as a relay to the remote UE device, the access of the remote UE device to the network impacts the resource usage of the network. In one example, therefore, the remote UE device should preferably connect to the cell using the highest priority frequency that is available. If there are two relay UE devices connected to the gNB where one is on a first frequency (F1) and the other is on a second frequency (F2) having higher priority than F1, the remote UE device selects the relay UE device using F2.

In some examples, therefore, the selected system information includes frequency priority IEs from SIB4. Furthermore, the relay UE device also indicates to the remote UE device frequency of the Uu link on which the relay UE deice is camped. In one technique, the relay UE device indicates the frequency the remote UE device sends the selected system information including the selected SIB4 IEs. With another technique, the relay UE device only indicates it is camped on a frequency when it is not the highest priority frequency based on SIB4.

After selecting a relay UE device, the remote UE device 648 uses the selected system information provided by the selected relay UE device to establish the U2N connection to the serving cell through the selected relay UE device. Therefore, the remote UE device uses the current system information for the cell instead of preconfigured system information. This provides a mechanism for the gNBs to more efficiently manage access to the network. Since system information can be dynamically configured, the cell expects all the UE devices that access the cell to operate according to the latest system information.

As discussed below, the selected system information further may include discovery resource pool information associating sidelink discovery resources with Uu Reference Signals Received Power (RSRP) levels. In accordance with conventional systems, candidate relay UE devices transmit sidelink discovery messages using resources that are allocated for UE devices measuring a Uu RSRP within a particular RSRP range. In other words, a UE device transmits sidelink discovery messages using a communication resource from the pool of discovery resources associated with the measured Uu RSRP. For some examples herein, the remote UE device performs relay reselection at least partially based on the communication resources used to transmit sidelink discovery signals. The sidelink discovery communication resource of a received sidelink discovery message reveals the quality of the Uu link between the relay UE device transmitting the discover message and the serving cell. The remote UE device selects a relay UE device partially based on the Uu link. For example, the remote UE device may select the relay UE device with a higher quality Uu link from two candidate relay UE devices with similar PC5 link quality levels.

In some situations, the discovery pool information is provided to the relay UE device by providing a shared discovery pool where discovery pool and traffic pool information is conveyed by the gNB to relay UE device. In accordance with current standards, the shared pool for discovery and traffic is provided under SIB12 using the sl-TxPoolSelectedNormal IE. In some situations, therefore, the selected system information includes selected shared pool information received in SIB12. Where there is dedicated discovery pool, the discovery pool information may be provided in a SIB and the relay UE device selects the discovery pool information and provides it as part of the selected system information. Current standards to not specify the particular SIB for conveying dedicated discovery pool information. The discovery pool information may be conveyed to the relay UE device using dedicated signaling.

Figure 7:
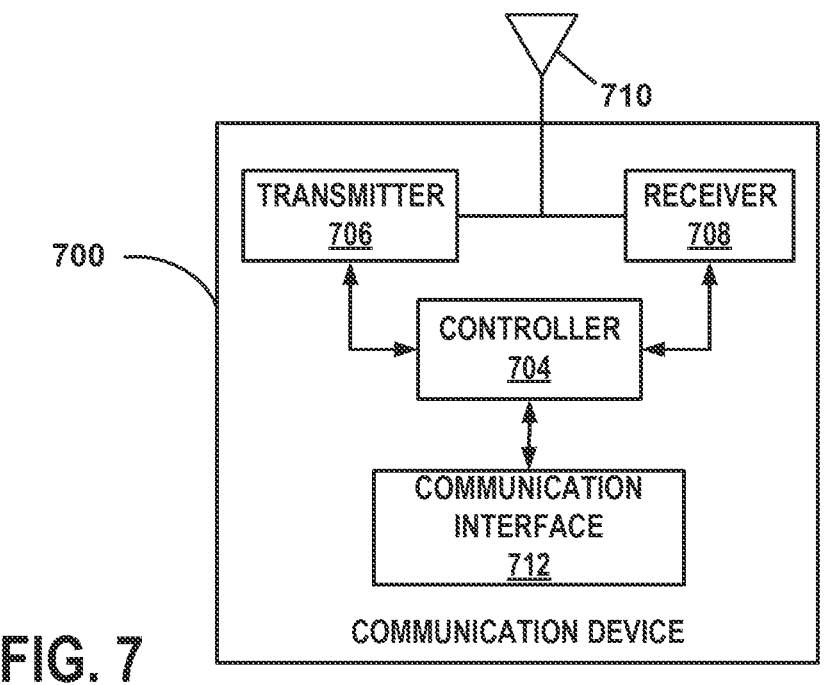
FIG. 7 is a block diagram of an example of a base station suitable for use as both the base stations and any base station serving any of the UE devices.

FIG. 7 is a block diagram of an example of a base station 700 suitable for use as both the base stations 624, 632 and any base station providing a cell 210, 212, 304, 406, 408, 514 or otherwise serving any of the UE devices. The base station 700 includes a controller 704, transmitter 706, and receiver 708, as well as other electronics, hardware, and code. The base station 700 is any fixed, mobile, or portable equipment that performs the functions described herein. The various functions and operations of the blocks described with reference to the base stations 624, 632, 700 may be implemented in any number of devices, circuits, or elements. Two or more of the functional blocks may be integrated in a single device, and the functions described as performed in any single device may be implemented over several devices. The base station 700 may be a fixed device or apparatus that is installed at a particular location at the time of system deployment. Examples of such equipment include fixed base stations or fixed transceiver stations. Although the base station may be referred to by different terms, the base station is typically referred to as a gNodeB or gNB when operating in accordance with one or more communication specifications of the 3GPP V2X operation. In some situations, the base station 700 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 700 may be a portable device that is not fixed to any particular location.

The controller 704 includes any combination of hardware, software, and/or firmware for executing the functions described herein as well as facilitating the overall functionality of the base station 700. An example of a suitable controller 704 includes code running on a microprocessor or processor arrangement connected to memory. The transmitter 706 includes electronics configured to transmit wireless signals. In some situations, the transmitter 706 may include multiple transmitters. The receiver 708 includes electronics configured to receive wireless signals. In some situations, the receiver 708 may include multiple receivers. The receiver 708 and transmitter 706 receive and transmit signals, respectively, through an antenna 710. The antenna 710 may include separate transmit and receive antennas. In some circumstances, the antenna 710 may include multiple transmit and receive antennas.

The transmitter 706 and receiver 708 in the example of FIG. 7 perform radio frequency (RF) processing including modulation and demodulation. The receiver 708, therefore, may include components such as low noise amplifiers (LNAs) and filters. The transmitter 706 may include filters and amplifiers. Other components may include isolators, matching circuits, and other RF components. These components in combination or cooperation with other components perform the base station functions. The required components may depend on the particular functionality required by the base station.

The transmitter 706 includes a modulator (not shown), and the receiver 708 includes a demodulator (not shown). The modulator modulates the signals to be transmitted as part of the downlink signals and can apply any one of a plurality of modulation orders. The demodulator demodulates any uplink signals received at the base station 700 in accordance with one of a plurality of modulation orders.

The base station 700 includes a communication interface 712 for transmitting and receiving messages with other base stations. The communication interface 712 may be connected to a backhaul or network enabling communication with other base stations. In some situations, the link between base stations may include at least some wireless portions. The communication interface 712, therefore, may include wireless communication functionality and may utilize some of the components of the transmitter 706 and/or receiver 708.

Figure 8:
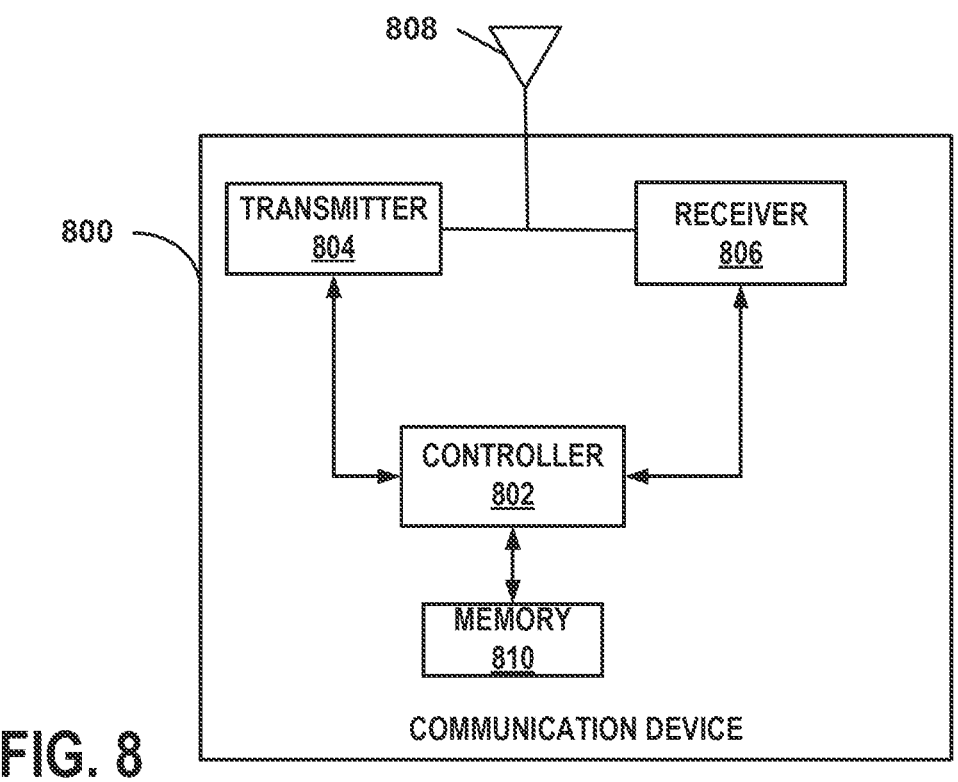
FIG. 8 is a block diagram of an example of a UE device suitable for use as each of the UE devices.

FIG. 8 is a block diagram of an example of a UE device 800 suitable for use as each of the UE devices 10, 16, 18, 102, 106, 108, 206, 208, 510, 601-604, 648. In some examples, the UE device 800 is any wireless communication device such as a mobile phone, a transceiver modem, a personal digital assistant (PDA), a tablet, or a smartphone. In other examples, the UE device 800 is a machine type communication (MTC) communication device or Internet-of-Things (IOT) device. The UE device 800, therefore is any fixed, mobile, or portable equipment that performs the functions described herein. The various functions and operations of the blocks described with reference to UE device 800 may be implemented in any number of devices, circuits, or elements. Two or more of the functional blocks may be integrated in a single device, and the functions described as performed in any single device may be implemented over several devices.

The UE device 800 includes at least a controller 802, a transmitter 804 and a receiver 806. The controller 802 includes any combination of hardware, software, and/or firmware for executing the functions described herein as well as facilitating the overall functionality of a communication device. An example of a suitable controller 802 includes code running on a microprocessor or processor arrangement connected to memory. The transmitter 804 includes electronics configured to transmit wireless signals. In some situations, the transmitter 804 may include multiple transmitters. The receiver 806 includes electronics configured to receive wireless signals. In some situations, the receiver 806 may include multiple receivers. The receiver 804 and transmitter 806 receive and transmit signals, respectively, through antenna 808. The antenna 808 may include separate transmit and receive antennas. In some circumstances, the antenna 808 may include multiple transmit and receive antennas.

The transmitter 804 and receiver 806 in the example of FIG. 8 perform radio frequency (RF) processing including modulation and demodulation. The receiver 804, therefore, may include components such as low noise amplifiers (LNAs) and filters. The transmitter 806 may include filters and amplifiers. Other components may include isolators, matching circuits, and other RF components. These components in combination or cooperation with other components perform the communication device functions. The required components may depend on the particular functionality required by the communication device.

The transmitter 806 includes a modulator (not shown), and the receiver 804 includes a demodulator (not shown). The modulator can apply any one of a plurality of modulation orders to modulate the signals to be transmitted as part of the uplink signals. The demodulator demodulates the downlink signals in accordance with one of a plurality of modulation orders.

Figure 9:
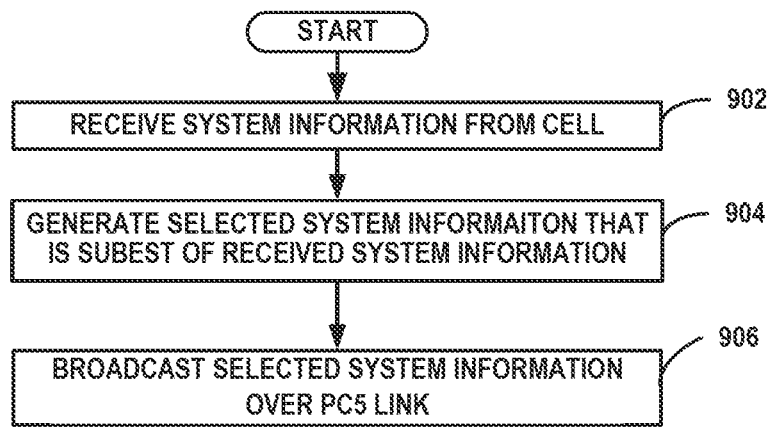
FIG. 9 is a flow chart of an example of a method for conveying selected system information to a remote UE device.

FIG. 9 is a flow chart of an example of a method for conveying selected system information to a remote UE device. The example is performed by a relay UE device and can therefore be performed by one of the relay UE devices 16, 18, 510, 601-604 discussed above.

At step 902, system information is received from a cell. In accordance with known techniques, a gNB providing a cell to the relay UE device transmits system information. As discussed above, the system information includes MSI and may include OSI.

At step 904, selected system information is generated from the received system information. The relay UE device selects system information that is useful to a remote UE device to generate selected system information which is portion or subset of the system formation. For at least some examples, the selected system information includes at least a subset of MSI. The selected system information may also include subsets of information of other SIBs received from the cell.

At step 906, the selected system information is broadcast to at least one remote UE device over a PC5 link. For the example, the relay UE device transmits the selected system information in a sidelink discovery message which may be in accordance with either Model A or Model B discovery procedures.

Figure 10:
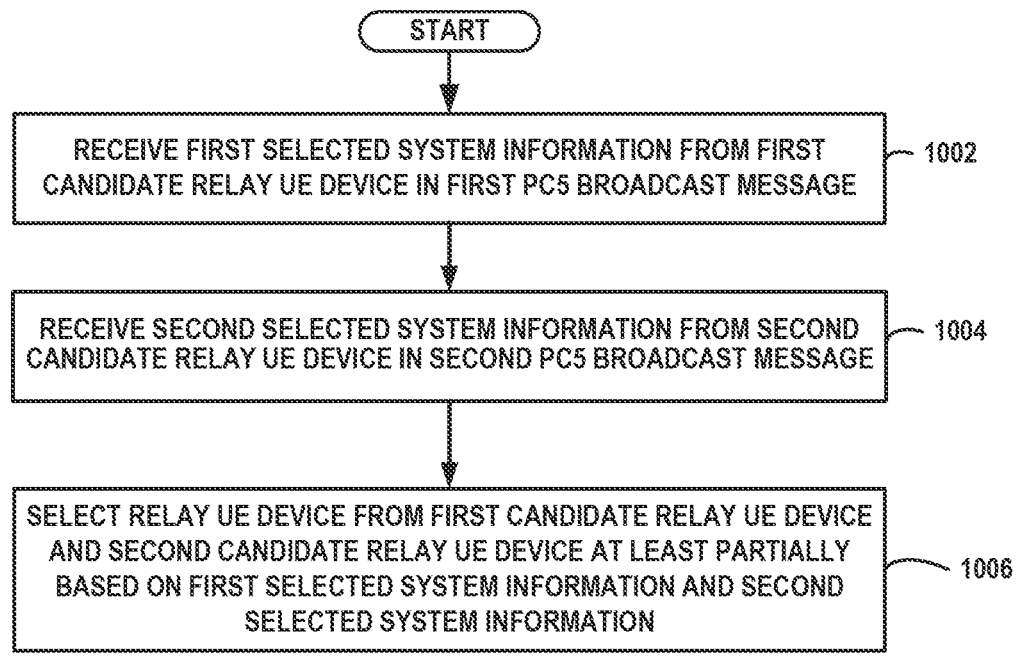
FIG. 10 is a flow chart of an example of a method of relay reselection based on selected system information received from candidate relay UE devices.

FIG. 10 is a flow chart of an example of a method of relay reselection based on selected system information received from candidate relay UE devices. The method is performed by a remote UE device that is selecting or reselecting a relay UE device to maintain or establish a U2N relay connection. Accordingly, the method may be performed any of the remote UE devices 10, 102, 201, 519, 648, 700 discussed above.

At step 1002, first selected system information is received from a first candidate relay UE device in a first PC5 broadcast message. For the example, the PC5 broadcast message is a sidelink discovery message. The first selected system information is a subset of the system information received by the first candidate relay UE device from its serving cell.

At step 1004, second selected system information is received from a second candidate relay UE device in a second PC5 broadcast message. For the example, the PC5 broadcast message is a sidelink discovery message. The second selected system information is a subset of the system information received by the second candidate relay UE device from its serving cell.

At step 1006, a relay UE device is selected from the first candidate relay UE device and the second candidate relay UE device at least partially based on the selected system information received from each candidate. The remote UE device may evaluate any of several parameters to determine which relay UE device should be selected. Examples of criteria include information related to cell barring, provided services, and frequency reselection. The criteria may also be based on other information. For example, discovery signal resources used for transmitting the SL discovery messages may be used to determine the RSRP levels of the Uu link of each candidate relay UE device to its serving cell allowing the remote UE device to take into account the Uu link quality of each candidate when selecting a relay UE device.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A remote user equipment (UE) device comprising:
   a receiver configured to receive a first sidelink discovery message and a second sidelink discovery message, the first sidelink discovery message transmitted from a first candidate relay UE device using a first discovery pool resource of a first discovery resource pool, the second sidelink discovery message transmitted from a second candidate relay UE device using a second discovery pool resource of a second discovery resource pool, the first discovery resource pool allocated for sidelink discovery message transmission from UE devices having destination link quality levels within a first quality range, the second discovery resource pool allocated for sidelink discovery message transmission from UE devices having destination link quality levels within a second quality range; and
   a controller configured to select, from the first candidate relay UE device and the second candidate UE relay device and at least partially based on the first discovery pool resource and the second discovery pool resource, a selected relay UE device for communication between the remote UE device and the destination through the selected relay UE device.

2. The remote UE device of claim 1, wherein the destination is a network and the destination link quality levels are Uu Reference Signals Received Power (RSRP) levels to a cell of the network.

3. The remote UE device of claim 2, wherein the first candidate relay UE device and the second relay UE device are connected to the network through the same cell.

4. The remote UE device of claim 2, wherein the first candidate relay UE device is connected to the network through a first cell and the second relay UE device is connected to the network through a second cell.

5. The remote UE device of claim 4, wherein a single base station provides the first cell and the second cell.

6. The remote UE device of claim 4, wherein a first base station provides the first cell and a second base station provides the second cell.

7. The remote UE device of claim 1, wherein the destination is a destination UE device and the destination link quality levels are Reference Signals Received Power (RSRP) levels of a communication link to the destination UE device.

8. The remote UE device of claim 1, wherein the receiver is further configured to receive discovery pool information from at least one of the first candidate relay UE and the second candidate relay UE, the discovery pool information indicating an allocation of discovery pool resources based on Reference Signals Received Power (RSRP) level.

9. The remote UE device of claim 8, wherein the receiver is configured to receive first selected system information from the first candidate relay UE and second selected system information from the second candidate relay UE, wherein the first selected system information is a portion of first relay-received system information received at the first candidate relay UE from a first cell, and wherein the second selected system information is a portion of second relay-received system information received at the second candidate relay UE from a second cell, the first selected system information comprising first discovery pool information of the first cell, the second system information comprising second discovery pool information of the second cell.

10. The remote UE device of claim 8, wherein the first selected system information is a portion of SIB12 received at the first candidate relay UE device from the first cell and the second selected system information is a portion of SIB12 received at the second candidate relay UE device from the from the second cell.

11. The remote UE device of claim 1, wherein the controller is configured to determine a first UE-to-relay (U2R) link quality level of a first U2R link from the remote UE device to the first candidate relay UE and to determine a second U2R link quality level of a second U2R link from the remote UE device to the second candidate relay UE, the controller configured to select the relay UE device at least partially based on the first U2R link quality level and the second U2R link quality level.

12. A remote user equipment (UE) device comprising:
    a receiver configured to receive a first sidelink discovery message and a second sidelink discovery message, the first sidelink discovery message transmitted from a first candidate relay UE device using a first discovery pool resource of a first discovery resource pool, the second sidelink discovery message transmitted from a second candidate relay UE device using a second discovery pool resource of a second discovery resource pool, the first discovery resource pool allocated for sidelink discovery message transmission from UE devices having Uu Reference Signals Received Power (RSRP) levels within a first RSRP range, the second discovery resource pool allocated for sidelink discovery message transmission from UE devices having Uu RSRP levels within a second RSRP range; and
    a controller configured to select, from the first candidate relay UE device and the second candidate UE relay device and at least partially based on the first discovery pool resource and the second discovery pool resource, a selected relay UE device for UE-to-Network (U2N) communication.

13. The remote UE device of claim 12, wherein the receiver is further configured to receive discovery pool information from at least one of the first candidate relay UE and the second candidate relay UE, the discovery pool information indicating an allocation of discovery pool resources based on RSRP level.

14. The remote UE device of claim 13, wherein the receiver is configured to receive first selected system information from the first candidate relay UE and second selected system information from the second candidate relay UE, wherein the first selected system information is a portion of first relay-received system information received at the first candidate relay UE from a first cell, and wherein the second selected system information is a portion of second relay-received system information received at the second candidate relay UE from a second cell, the first selected system information comprising first discovery pool information of the first cell, the second system information comprising second discovery pool information of the second cell.

15. The remote UE device of claim 14, wherein the first selected system information is a portion of SIB12 received at the first candidate relay UE device from the first cell and the second selected system information is a portion of SIB12 received at the second candidate relay UE device from the from the second cell.

16. The remote UE device of claim 12, wherein the controller is configured to determine a first UE-to-relay (U2R) link quality level of a first U2R link from the remote UE device to the first candidate relay UE and to determine a second U2R link quality level of a second U2R link from the remote UE device to the second candidate relay UE, the controller configured to select the relay UE device at least partially based on the first U2R link quality level and the second U2R link quality level.

* * * * *